(12) United States Patent
Blue

(10) Patent No.: US 10,225,267 B2
(45) Date of Patent: *Mar. 5, 2019

(54) MONITORING USE OF A SENSOR OF A COMPUTING DEVICE

(71) Applicant: INTERNATIONAL BUSINESS MACHINES CORPORATION, Armonk, NY (US)

(72) Inventor: George M. Blue, Hursley (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/842,553

(22) Filed: Dec. 14, 2017

(65) Prior Publication Data

US 2018/0109543 A1  Apr. 19, 2018

Related U.S. Application Data

(63) Continuation of application No. 14/943,548, filed on Nov. 17, 2015, now Pat. No. 9,866,572.

(30) Foreign Application Priority Data

Nov. 20, 2014  (GB) .................................. 1420609.8

(51) Int. Cl.
G06F 11/00 (2006.01)
G06F 12/14 (2006.01)
G06F 12/16 (2006.01)
G08B 23/00 (2006.01)
H04L 29/06 (2006.01)

(52) U.S. Cl.
CPC ............................. *H04L 63/1408* (2013.01)

(58) Field of Classification Search
None
See application file for complete search history.

(56) References Cited

U.S. PATENT DOCUMENTS 7,941,852 B2  5/2011 Repasi et al.
9,866,572 B2  1/2018 Blue
2009/0189981 A1  7/2009 Siann et al.
(Continued)

FOREIGN PATENT DOCUMENTS

WO  WO2013144966  10/2013
WO  WO2014116977  4/2014

OTHER PUBLICATIONS

List of IBM Patents or Patent Applications Treated as Related, Jan. 12, 2018, 2 pages.
(Continued)

*Primary Examiner* — Kambiz Zand
*Assistant Examiner* — Arezoo Sherkat
(74) *Attorney, Agent, or Firm* — Heslin Rothenberg Farley & Mesiti P.C.; Robert Shatto

(57) ABSTRACT

Monitoring use of a sensor of a computing device. A sensor obtains information from an environment of the computing device. A co-processor provides functionality for the sensor, and at least one channel connects the co-processor to a central processing unit (CPU) of the computing device. Sensor data transmission is monitored over the at least one channel to determine when a transmission of data changes from a low data transmission mode to a high data transmission mode, and an alert is activated when the transmission of data is in the high data transmission mode.

20 Claims, 8 Drawing Sheets

(56) References Cited

U.S. PATENT DOCUMENTS

| | | |
|---|---|---|
| 2010/0125663 A1 | 5/2010 | Donovan et al. |
| 2010/0141762 A1 | 6/2010 | Siann et al. |
| 2011/0195777 A1 | 8/2011 | Abe et al. |
| 2012/0151606 A1 | 6/2012 | Hannon |
| 2013/0196649 A1 | 8/2013 | Paddon et al. |
| 2013/0312124 A1 | 11/2013 | Ribeiro-Pereira |
| 2014/0028777 A1 | 1/2014 | Koberling |
| 2014/0123208 A1 | 5/2014 | Plagemann et al. |
| 2014/0143864 A1 | 5/2014 | Miliefsky |
| 2014/0157405 A1 | 6/2014 | Joll et al. |

OTHER PUBLICATIONS

Search Report for GB1420609.8 dated May 21, 2015, pp. 1-3.
Brocker, Matthew et al., "iSeeYou: Disabling the MacBook Webcam Indicator LED," pp. 1-3 (abstract only).
Farley, Ryan et al., "Roving Bugnet: Distributed Surveillance Threat and Mitigation," Computers & Security; vol. 29, Issue 5, Jul. 2010, pp. 1-13.

MONITORING USE OF A SENSOR OF A COMPUTING DEVICE

PRIOR FOREIGN APPLICATION

This application claims priority from United Kingdom (GB) patent application number 1420609.8, filed Nov. 20, 2014, which is hereby incorporated herein by reference in its entirety.

BACKGROUND

One or more aspects of this invention relate to the field of monitoring use of a sensor of a computing device. In particular, one or more aspects of the invention relate to monitoring use of a sensor to detect unauthorized use of a sensor.

Many consumer electronic devices are provided with cameras and microphones for applications where they are required. There is a growing concern that malicious software can be used to hijack these sensors and use them for malicious surveillance purposes. This is particularly of concern for individuals and organizations who are in possession of high value information, such as confidential financial information, intellectual property and trade secrets.

Consider the possibility that a company employee is in a meeting discussing company confidential information. The employee may have his laptop with him, and his smart phone in his pocket. A competitor, or other entity which is unfriendly to the company, may have installed malicious software on the employee's laptop or smart phone which they can use to see and listen in to these conversations using the sensors on the laptop and/or smart phone.

It is possible to install protective software on computers and smart phones which may detect and prevent such malicious software, however, such protective software may be circumvented or avoided by the malicious use. Also, in the above scenario, the company may have installed protective software on the employee's laptop, but the company may not have installed protective software on the employee's smart phone as this is his own personal device.

It is common practice to install a light emitting diode (LED) indicator next to a built in camera in computers to inform the user that the camera is active. If this is done at the hardware level, then it is impossible to use the camera for surveillance without the user becoming aware. The same is possible for a microphone.

However applications are now being developed that require the camera or the microphone to be active all of the time. For instance, for the purpose of giving voice commands or gesture recognition. This means that an LED indicator will be on all of the time, and will cease to be a useful tool for detecting unwanted use of the hardware.

SUMMARY

According to one aspect, a system for monitoring use of a sensor of a computing device is provided. The system includes a memory; and a processor in communication with the memory, wherein the system is configured to perform a method. The method includes obtaining by sensor information from an environment of a computing device, wherein the sensor uses a co-processor for functionality; sending sensor data using at least one channel connecting the co-processor to a central processing unit (CPU) of the computing device; monitoring sensor data transmission over the at least one channel to determine when a transmission of data changes from a low data transmission mode to a high data transmission mode; and activating an alert when the transmission of data is in the high data transmission mode.

Methods and computer program products relating to one or more aspects are also described and may be claimed herein.

BRIEF DESCRIPTION OF THE DRAWINGS

The subject matter regarded as aspects of the invention is particularly pointed out and distinctly claimed in the concluding portion of the specification. Aspects of the invention, both as to organization and method of operation, together with objects, features, and advantages thereof, may best be understood by reference to the following detailed description when read with the accompanying drawings.

Embodiments of the present invention will now be described, by way of example only, with reference to the following drawings in which.

Figure 1A:
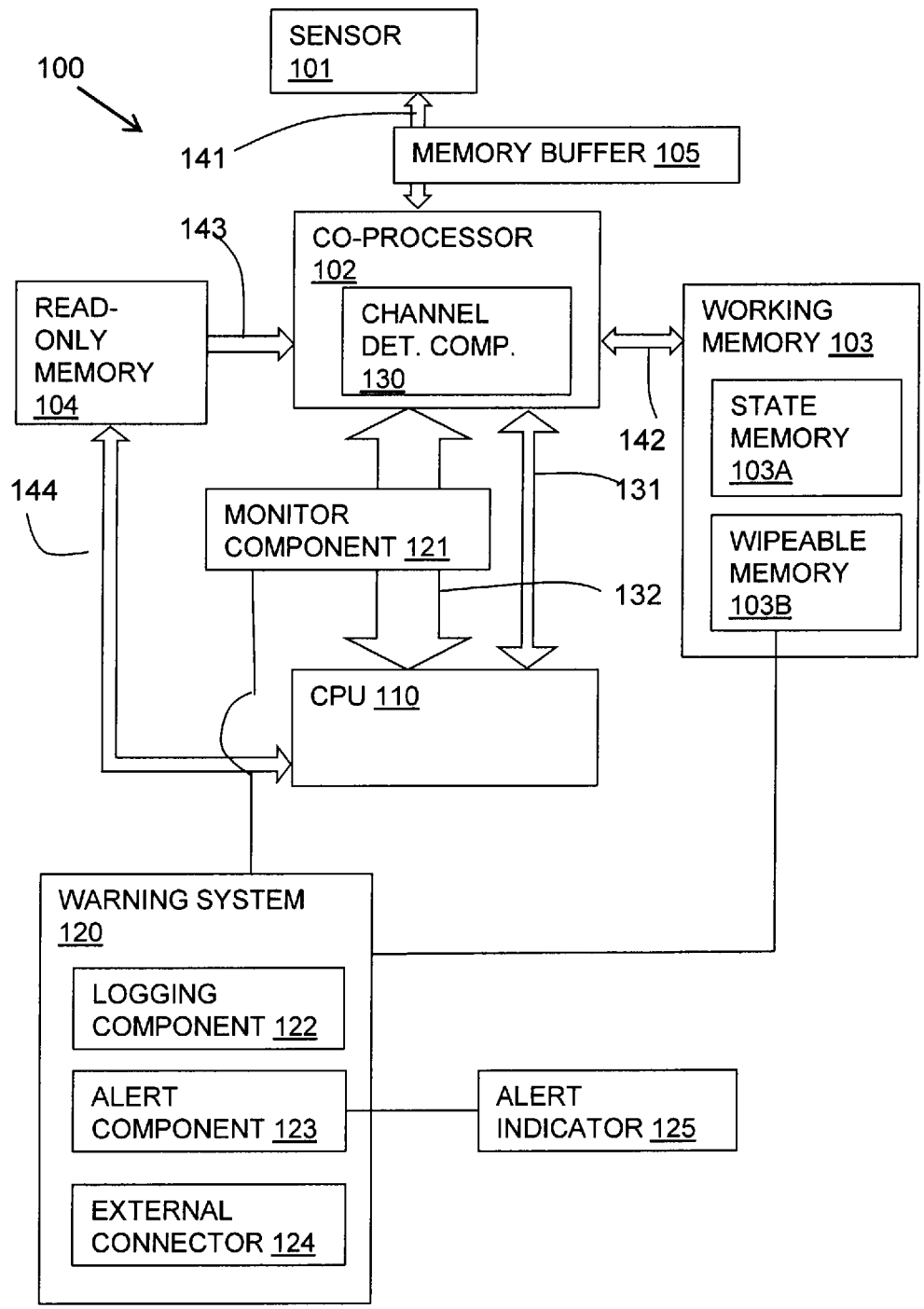
FIG. 1A is a block diagram of an example embodiment of a system in accordance with one or more aspects of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of aspects of the invention. However, it will be understood by those skilled in the art that aspects of the present invention may be practiced without these specific details. In other instances, well-known methods, procedures, and components have not been described in detail so as not to obscure the present invention.

A method, system and computer program product are provided for monitoring use of at least one sensor of a computing device.

The described system is provided in a computing device which has one or more sensors for obtaining information from the environment of the computing device. Sensors may include a camera for recording visual images or video, a microphone for recording sound, a motion sensor for recording movement, etc. The sensors have co-processors which carry out functionality for a sensor. More than one sensor may use a single co-processor, or a co-processor may be dedicated to an individual sensor. The co-processor may be a fully functioning processor that has separation from the main central processing unit (CPU) of the computing device. Existing forms of a co-processor may be used including sensor hubs.

Embodiments of the described system are provided. In one embodiment, a co-processor for a sensor has two physical or logical channels connecting the co-processor to the CPU of the computing device.

A first channel has a low bandwidth and a second channel has a higher bandwidth than the first channel. In the arrangement of two physical channels, the data rate on one of the channels may be restricted by the clock rate or any other method. The first channel has a predefined bandwidth threshold above which data is sent to the second channel with a higher bandwidth than the first channel.

The first channel may have a transmission threshold. The threshold may be defined as the total bandwidth available for the first channel, or as a data transmission rate of a maximum rate for the channel. For example, a threshold may be a maximum data transmission rate wherein the maximum is in the range of approximately 5 to 10 bits per second. In one specific example, the maximum may be a transmission rate of 8 bits per second (one byte per second).

In another embodiment, a co-processor for a sensor has a single physical channel connecting the co-processor to the CPU of the computing device. In this embodiment, a threshold data transmission rate is defined and the data transmission rate is monitored to determine when this reaches or exceeds the threshold.

The one or more channels between a co-processor for a sensor and the CPU of the computing device may be any form of bus for electronic or optical communication within the computing device, which may be parallel or serial.

A low bandwidth channel or a low data transmission rate is sufficient to transmit background data from a sensor to the CPU. Background data may include data that is used by applications running on the computing device as a background feature. Applications executing on a computing device which require one or more sensors to be on all of the time, do not require a high data rate from the sensor(s). In a first example, an application running on the computing device may be activated by verbal commands and therefore receives background sound from a microphone. The microphone's co-processor has only to transmit that a keyword has been spoken which requires only a single bit. In a second example, a camera may be used for gesture recognition and data relating to detected gestures may be sent via the low bandwidth first channel or within a low data transmission rate. The camera's co-processor has only to transmit which gesture is being used or which face is detected—which requires only a few bits of data at a low bit rate.

A higher bandwidth or higher data transmission rate is required for transmitting substantial data from the sensor, for example in the form of spoken sentences in the case of the microphone and video data in the case of a camera.

In one example, the system includes a monitor that is used to detect whether a sensor is in a high or a low data mode, and an alert component issues a warning only when the sensor is in high data mode.

In one embodiment, the low data mode is when the first low bandwidth channel is being used to transmit data between the co-processor and the CPU and the high data mode is when the second higher bandwidth channel is used. In the second embodiment, the low data mode is when data is being transmitted via the single channel at a rate below the specified threshold and a high data mode is when the data transmission rate goes above the threshold.

The monitor may be provided in various different embodiments. For example, the monitor may be an independent integrated circuit or may be provided in the memory management area on the CPU or in the hardware of a channel. The monitor is not re-programmable so that it cannot be disabled by a computer program.

The monitor may be provided for the one or more channels to monitor whether or not the channel is active and/or the rate of the transmission on a channel.

In one embodiment, the monitor may be provided on the second channel and may monitor data transmission using the second channel indicating that a higher volume of data is being transmitted compared to just the background sensor data. Alternatively, the monitor may be provided on the first channel and may monitor when data transmission stops on the first channel suggesting that data is being transmitted via the higher bandwidth second channel. In a further arrangement, the monitor may be provided at the co-processor or CPU to determine the volume of data.

Figure 1B:
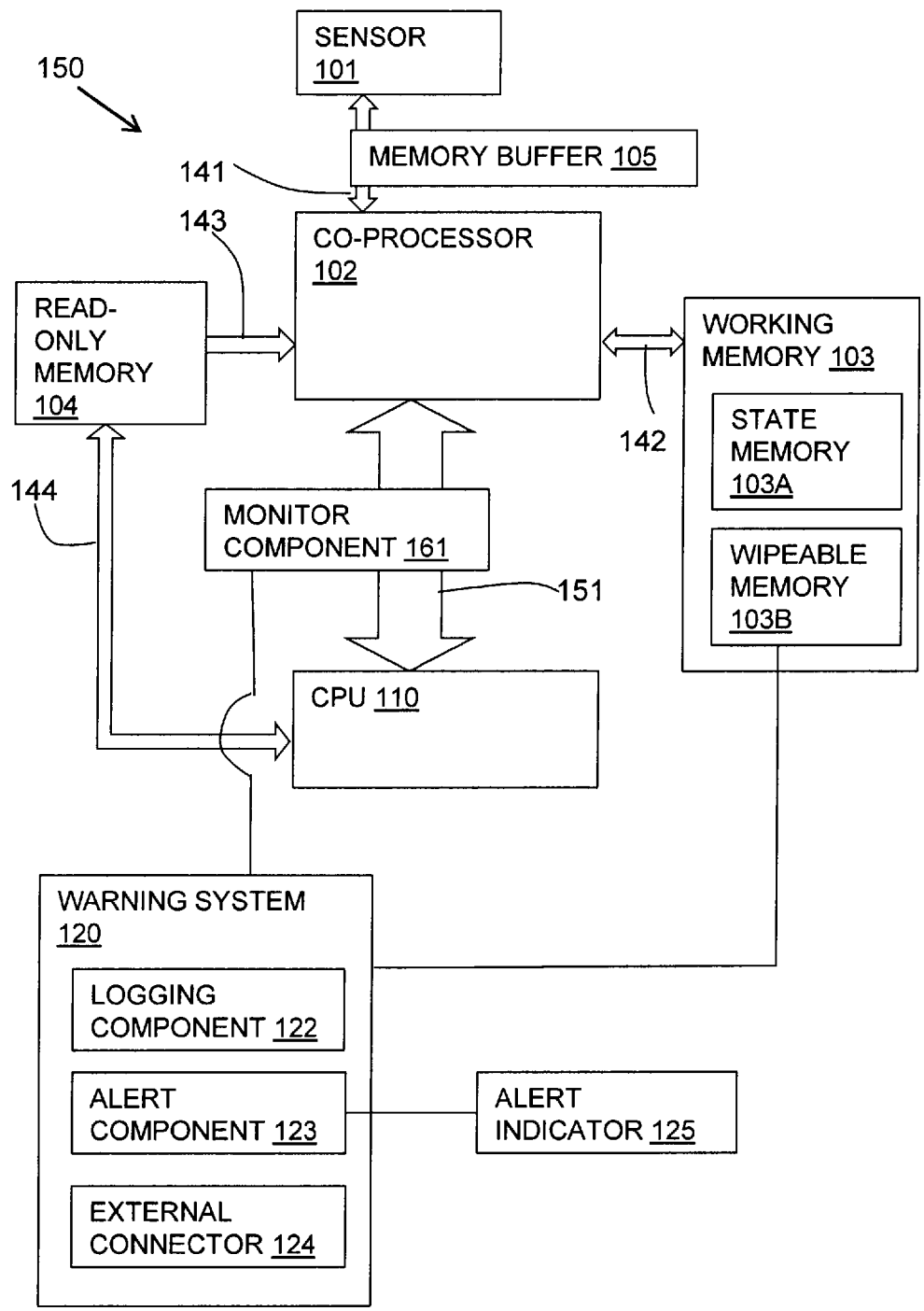
FIG. 1B is a block diagram of an example embodiment of a system in accordance with one or more aspects of the present invention.

FIGS. 1A and 1B show block diagrams illustrating embodiments of a system 100, 150 within a computing device.

Referring to FIGS. 1A and 1B, a computing device has one or more sensors 101. The sensors 101 may be a camera, a microphone, a movement detector, or other form of sensor capable of obtaining data from the environment of the computing device. The sensors 101 may be built into the computing device, or may be attachable thereto.

A sensor 101 has a co-processor 102 which may be a fully functioning processor that is dedicated to the sensor 101, and has separation from a main CPU 110 at a hardware level. The sensor 101 sends 141 the obtained data to co-processor 102.

A single sensor 101 may have a dedicated co-processor 102 in which case the described monitoring system may monitor the single sensor 101. Alternatively, two or more sensors 101 may share a co-processor 102 in which case the described monitoring system may monitor and provide an alert for the activation of any one of the two or more sensors.

The co-processor 102 may have a number of types of memory available to it.

The co-processor 102 may include a memory buffer 105 (for example, direct memory access (DMA)) which should be isolated memory so that it cannot be accessed without going through the co-processor 102. The memory buffer 105 has data from the sensor 101 written to it and the co-processor 102 can read from it (but not write to it). The memory buffer 105 may be limited in length time-wise so that it cannot contain a length of sensor data. For example, it should not contain the last 10 minutes of background conversation. It should be limited to a duration from which only a small amount of information can be obtained, for example, approximately 5 seconds.

The co-processor 102 requires an amount of working memory 103 which it can write to in order to carry out tasks such as calculations, processing voice commands, processing visual input, etc. The problem with working memory is that it could be used to store up information (for example, conversations going on in the background) and then transmit this information once a high-bandwidth mode is open. Therefore, limits are imposed on the working memory 103 to prevent this.

One option is to limit the size of the working memory 103 to a few hundred bytes. This is enough RAM memory for the co-processor to record the state of its processing, but is not sufficient to carry out significant processing tasks.

Another option is for the working memory 103 to include some state memory 103A and a larger area 103B of wipeable memory that is wiped (i.e. all the data removed) when a switch to the high data transmission mode occurs. This may be triggered by the warning system 120. If the co-processor 102 maintains a cache, then this should also be wiped when memory 103B is wiped. This means that any information gathered cannot be sent using the high data mode transmission. However, the co-processor 102 is not memory-constrained. The cleared memory would still be available to the co-processor 102 after the switch, it would simply have lost all its data, and some things would have to be re-computed. For instance, if a user said to a smart TV "computer, channel 1"; the co-processor would initially process the sounds, realize that the keyword "computer" has been used and switch to high-bandwidth mode. It would then need to re-process the data from the sensor buffer memory 105 and work with the CPU 110 to establish the exact command.

A further option is to implement the system using a plurality of memory buffers as the working memory 103 that are wiped at regular intervals. This would allow the co-processor 102 to remember its last short period of work (for example, 5 seconds) but nothing from before that. An option would be to have "forgetful memory" as working memory 103 that only maintains the last short period of work (for example, 5 seconds).

The co-processor 102 may also have a large area of read-only memory 104 available to it. This read-only memory 104 may be an area of RAM storage that is read-only 143 to the co-processor 102 although the CPU 110 can read and write 144 to it. The co-processor 102 may however send a request for data from the read-only memory 104. This read-only RAM storage may hold data such as keywords to listen for, and the program that the co-processor 102 runs.

A monitor component 121, 161 may be provided for monitoring whether the data transmission from the co-processor 102 to the CPU 110 is a low data transmission mode or a high data transmission mode. The monitor component 121, 161 may be in the form of a hardware component connected to a hardware-protected warning system 120 which in turn can be accessed for download through an external connector 124. The warning system 120 may include a logging component 122 and an alert component 123 for issuing a warning using an alert indicator 125. Warnings provided by the alert indicator 125 may include, but are not limited to sounds, indicator lights and vibration. An existing light emitting diode (LED) indicating that a sensor is in use may be adapted to provide the warning.

Referring to FIG. 1A, a system 100 in accordance with one embodiment is shown.

The co-processor 102 may be connected to the main CPU 110 via two channels, a first channel 131 which is a low bandwidth channel (for example, only a few bits per second), and a second channel 132 which is a higher bandwidth channel. The first, low bandwidth, channel 131 is not suitable for malicious activities such as surveillance due to not being able to get enough information through it.

The second, higher bandwidth, channel 132 can be used to receive high bandwidth information (such as full sound or video). The second, higher bandwidth, channel 132 may also be used to re-program the co-processor 102. The co-processor 102 has a computer program which may need updating via the CPU 110 if a bug fix is needed or a new function is added. In one embodiment, even if the co-processor's program is compromised, it still cannot be used to spy on the user as the increased data transmission would be detected.

The second channel 132 may, in this embodiment, include the monitor component 121 to detect when the second channel 132 is active.

The co-processor 102 may include a channel determining component 130 for determining which channel 131, 132 is suitable for a current level of data transmission from the sensor 101. The channel determining component 130 may use the first, low bandwidth channel 131 as a default channel for data transmission and may apply a predefined threshold of data transmission at which threshold level, data is transmitted via the higher bandwidth second channel.

The provision of a first channel 131 and a second channel 132 restricts the amount of data that a sensor 101 and its associated co-processor 102 can transmit to the CPU 110 without an alert being raised. Having more than one transmission mode enables a user to be alerted when the system switches between modes.

Referring to FIG. 1B, a system 150 in accordance with another embodiment is shown.

The co-processor 102 may be connected to the main CPU 110 via a single channel 151 which has a high bandwidth capability. However, a threshold data transmission rate is monitored on the single channel 151 by the monitor component 161 and if the threshold data transmission rate is exceeded, then the monitor component 161 raises an alert using the warning system 120.

Figure 2:
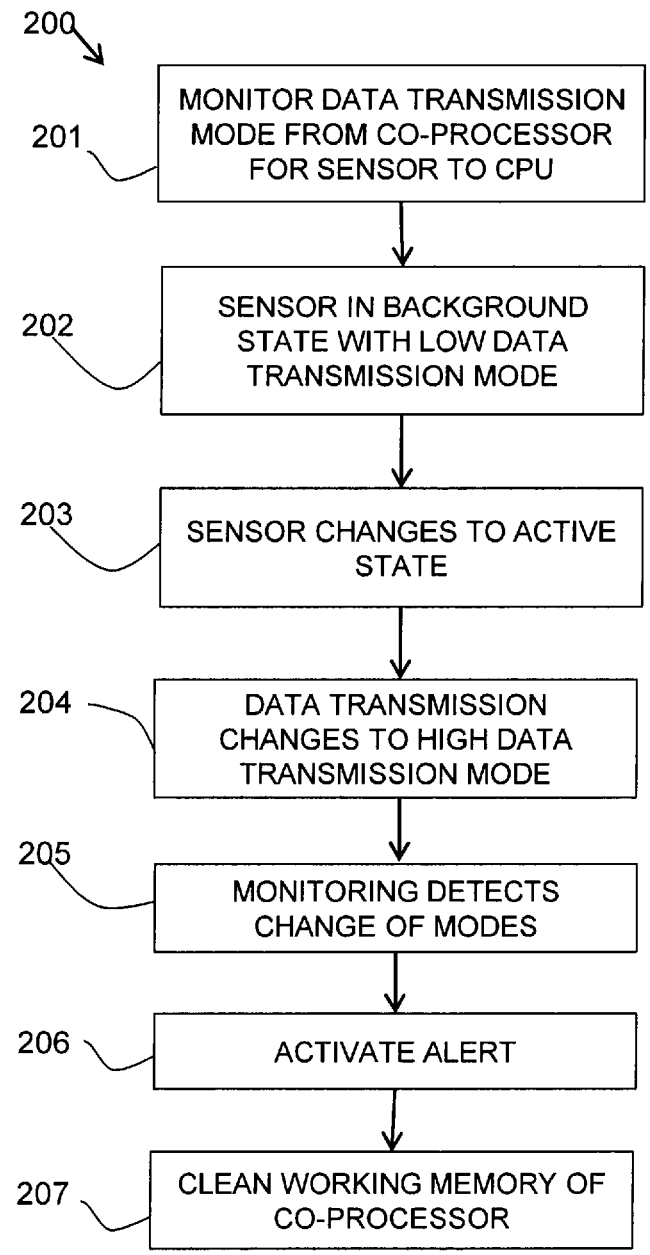
FIG. 2 is one example of a flow diagram of a method in accordance with an aspect of the present invention.

Referring to FIG. 2, a flow diagram 200 shows an example embodiment of the described method. The method encompasses both embodiments described above with respect to FIGS. 1A and 1B of having two channels or having a single channel between a co-processor of a sensor and a CPU of a computing device.

Monitoring 201 is carried out of the data transmission mode from a co-processor of a sensor to a CPU.

The sensor may be in background state sending 202 a low level of data from the co-processor to the CPU in a low data transmission mode. The low data transmission mode may send data over a low bandwidth channel of a pair of channels or may send data over a single high bandwidth channel but staying below a threshold data transmission rate.

The sensor may change 203 function to an active state sending 204 a higher level of data from the co-processor to the CPU in a high data transmission mode. The high data transmission mode may send data by switching from the low bandwidth channel to a higher bandwidth channel in a pair of channels or may send data over the single high bandwidth channel but breaching a threshold data transmission rate.

The monitoring detects 205 when data transmission from the co-processor of the sensor changes from a low data transmission mode to a high data transmission mode. The detection 205 may be carried out by detecting a change in a channel between a pair of channels from a low bandwidth channel to a higher bandwidth channel, or by detecting that a threshold data transmission rate of a single channel has been breached.

An alert is activated 206 to inform a user that the higher transmission mode from the sensor has started. The alert may activate a light or sound or may cause a window to pop-up on the screen of the computing device.

Figure 3A:
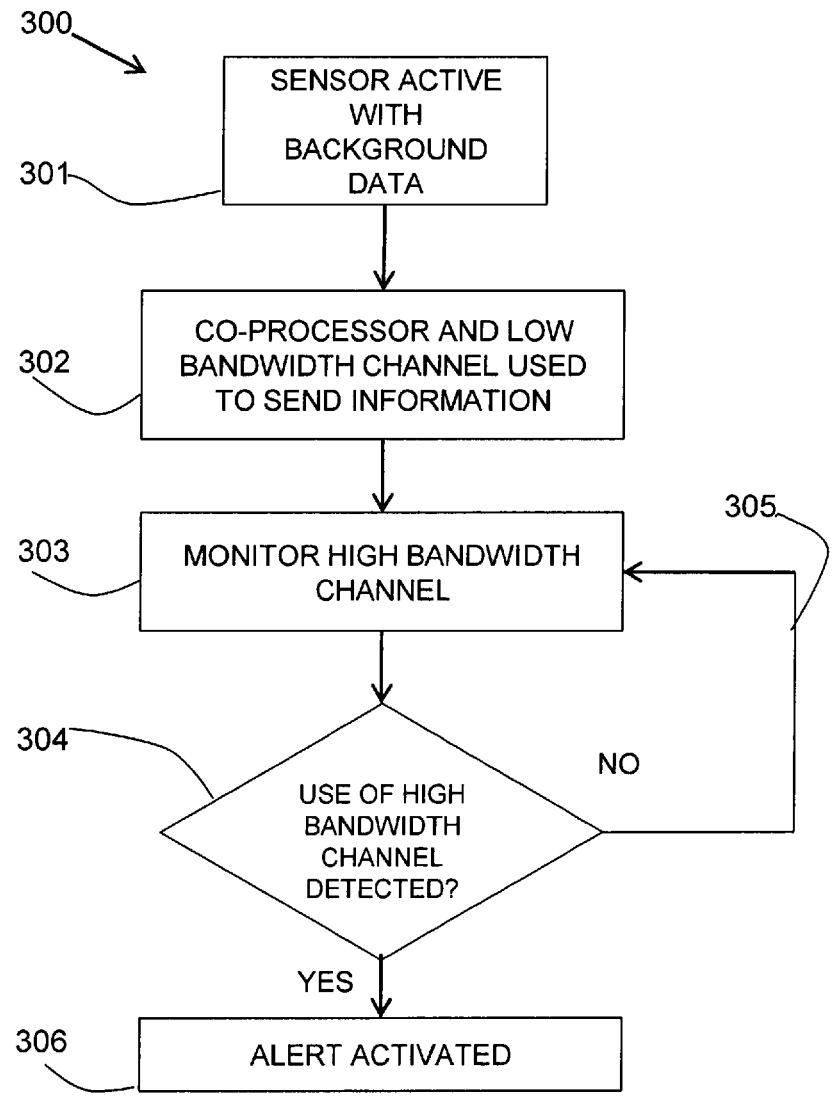
FIG. 3A is one example of a flow diagram of an aspect of an example embodiment of a method in accordance with an aspect of the present invention.
Figure 3B:
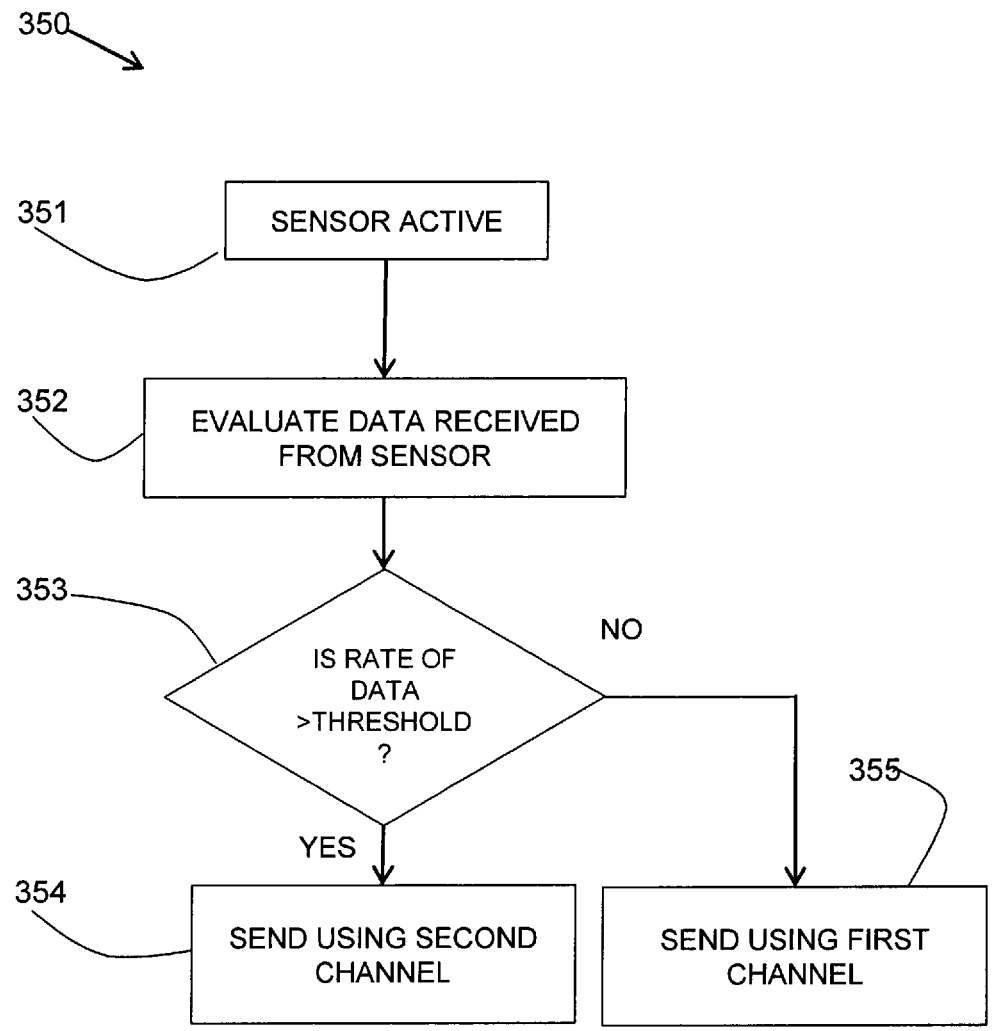
FIG. 3B is one example of a flow diagram of an aspect of an example embodiment of a method in accordance with an aspect of the present invention.

In addition, an optional step 207 may include cleaning a working memory of all data when the monitoring detects 205 that data transmission from the co-processor of the sensor changes from a low data transmission mode to a high data transmission mode. Referring to FIGS. 3A and 3B, flow diagrams 300, 350 show example embodiments of aspects of one embodiment of the described method.

FIG. 3A shows a flow diagram 300 of an aspect of monitoring data channel use. A sensor may be active 301 and generating background data. The sensor's co-processor and the first, low bandwidth, channel may be used to send 302 the background data to the CPU.

The second, higher bandwidth, channel may be monitored 303 for activity. It may be determined 304 if the second channel is being used. If no activity is monitored, the method may loop 305 to continue monitoring 303.

If it is determined 304 that the second channel is being used, an alert may be activated 306 to notify the user of this use indicating that more than background data is being transmitted. The user may be expecting such transmission and may therefore ignore the alert; however, if the user is not expecting such transmission, the user may investigate the data transmission.

FIG. 3B shows a flow diagram 350 of an aspect of determining which channel to use. A sensor may be active 351. Data received from the sensor may be evaluated 352 and it may be determined 353 if the rate of data transmission required is greater than a predefined threshold.

If the rate of data transmission is not greater than the predefined threshold, the data may be sent 355 via the first, low bandwidth, channel. However, if the rate of data transmission is greater than the predefined threshold, the data may be sent 354 via the second, high bandwidth, channel.

Figure 4:
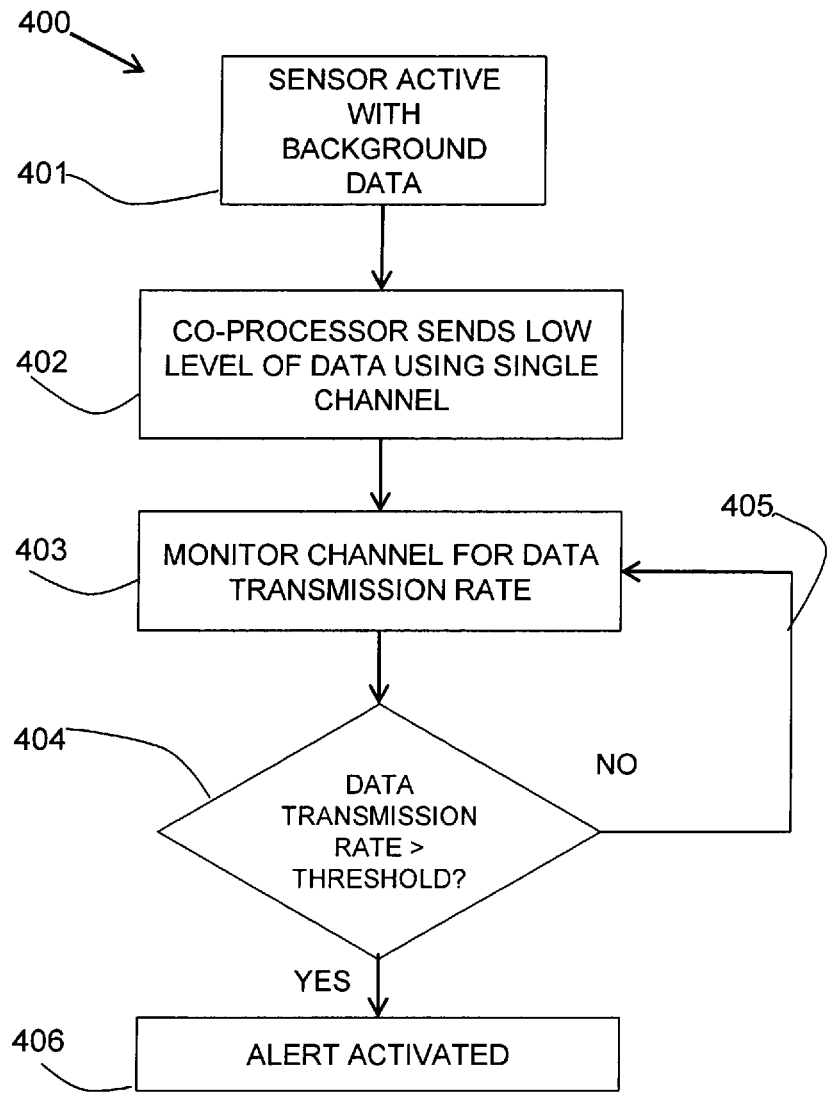
FIG. 4 is one example of a flow diagram of an aspect of an example embodiment of a method in accordance with an aspect of the present invention.

Referring to FIG. 4, a flow diagram 400 shows an example embodiment of another embodiment of the described method.

A sensor may be active 401 and generating background data. The sensor's co-processor may send 402 the background data to the CPU using a single channel.

The single channel may be monitored 403 to determine if the data transmission rate exceeds a threshold value. If it is not determined 404 that the threshold has been breached, the method may loop 405 to continue monitoring 403.

If it is determined 404 that the threshold has been breached, an alert may be activated 406 to notify the user of this use indicating that more than background data is being transmitted.

Scenario 1

In one described application, a sensor in the form of a camera is used for gesture recognition. The co-processor can process the information from the camera and interpret the gestures. It sends information about the gestures using the low data transmission mode. If there are 16 gestures and they take a second to perform, then 4 bits per second is acceptable to transmit using the low data transmission mode. If a malicious party tries to subvert the camera, then they use the high data transmission mode which activates a warning (e.g., a red LED next to the camera). The user will become suspicious when the warning occurs. However, if the user himself activates video conferencing, then the user will not be suspicious when the warning occurs.

Scenario 2

In another application, a sensor in the form of a microphone is used to command the device. The co-processor continually monitors the microphone for commands. When it detects a sound that it thinks is a command, it uses the high data transmission mode, for example, by asking the CPU for assistance in processing the command sound. In doing this, the warning is activated (e.g., a brief vibration), but the user is not suspicious because they have issued a command. However, if the warning is activated when a command has not been issued, the user will become suspicious. When using the microphone for conferencing, the warning will be continuous (an LED may be used), but the user will not be suspicious because it is what the members of the conferencing expect.

A further example usage of the described method and system is a smart television that has a camera constantly overlooking a room.

Figure 5:
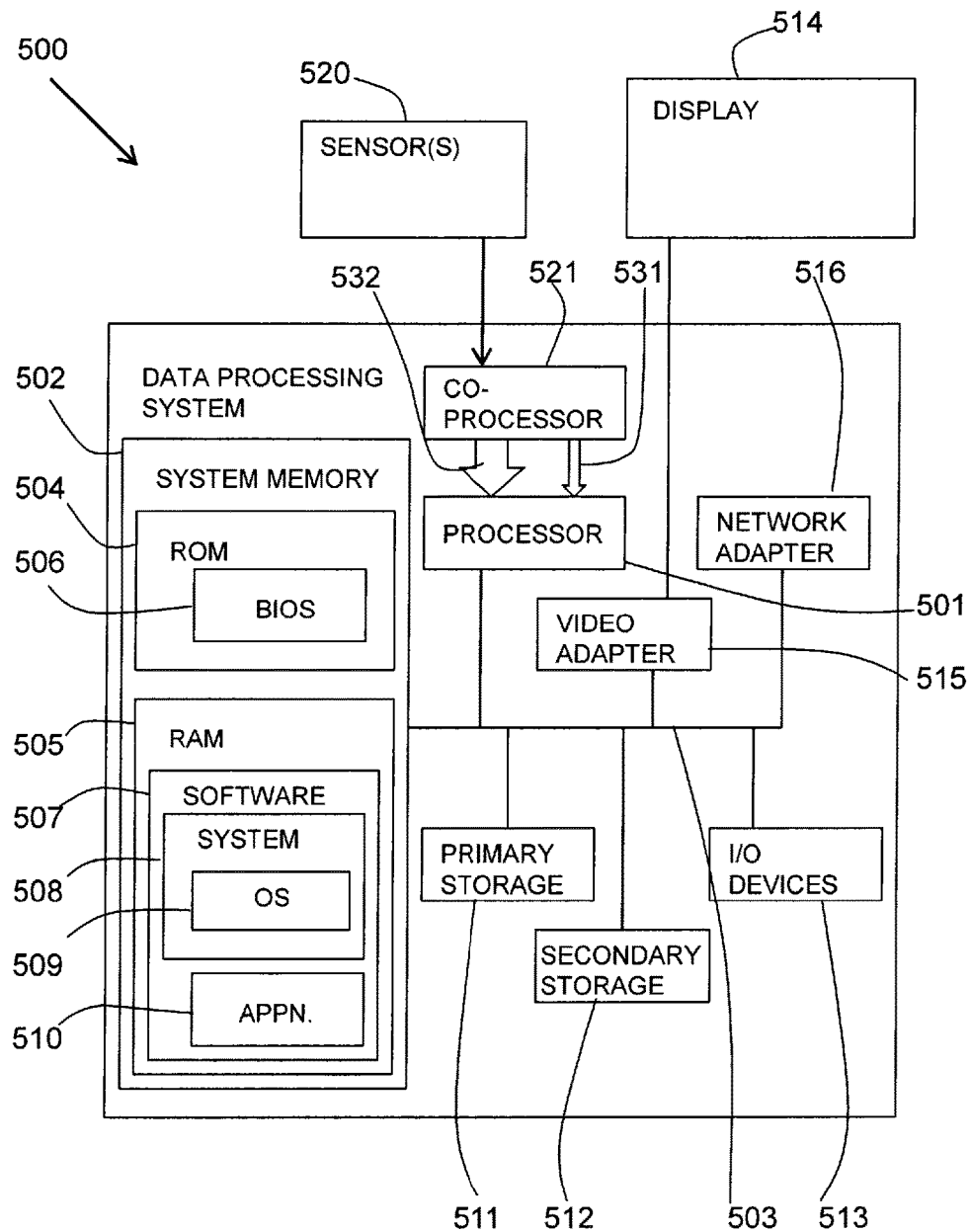
FIG. 5 is a block diagram of an embodiment of a computer system in which aspects of the present invention may be implemented.

Referring to FIG. 5, an example system for implementing aspects of the invention includes a computing device in the form of a data processing system 500 suitable for storing and/or executing program code including at least one processor 501 coupled directly or indirectly to memory elements through a bus system 503. The memory elements may include local memory employed during actual execution of the program code, bulk storage, and cache memories which provide temporary storage of at least some program code in order to reduce the number of times code is to be retrieved from bulk storage during execution.

The memory elements may include system memory 502 in the form of read only memory (ROM) 504 and random access memory (RAM) 505. A basic input/output system (BIOS) 506 may be stored in ROM 504. Software 507 may be stored in RAM 505 including system software 508 such as operating system software 509. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The data processing system 500 may operate in a networked environment using logical connections to one or more remote computers via a network adapter 516.

In addition to sensors to which the described system relates, the system 500 may include additional input/output devices 513 that may be coupled to the system either directly or through intervening I/O controllers. A user may enter commands and information into the system 500 through input devices such as a keyboard, pointing device, or other input devices (for example, microphone, joy stick, game pad, satellite dish, scanner, or the like). Output devices may include speakers, printers, etc. A display device 514 is also connected to system bus 503 via an interface, such as video adapter 515.

In accordance with an aspect of the described system, sensors 520 may be provided in the data processing system 500 having dedicated co-processors 521 each having one or more channels 531, 532 as part of the bus system 503 for data transmission to the processor 501.

Figure 6:
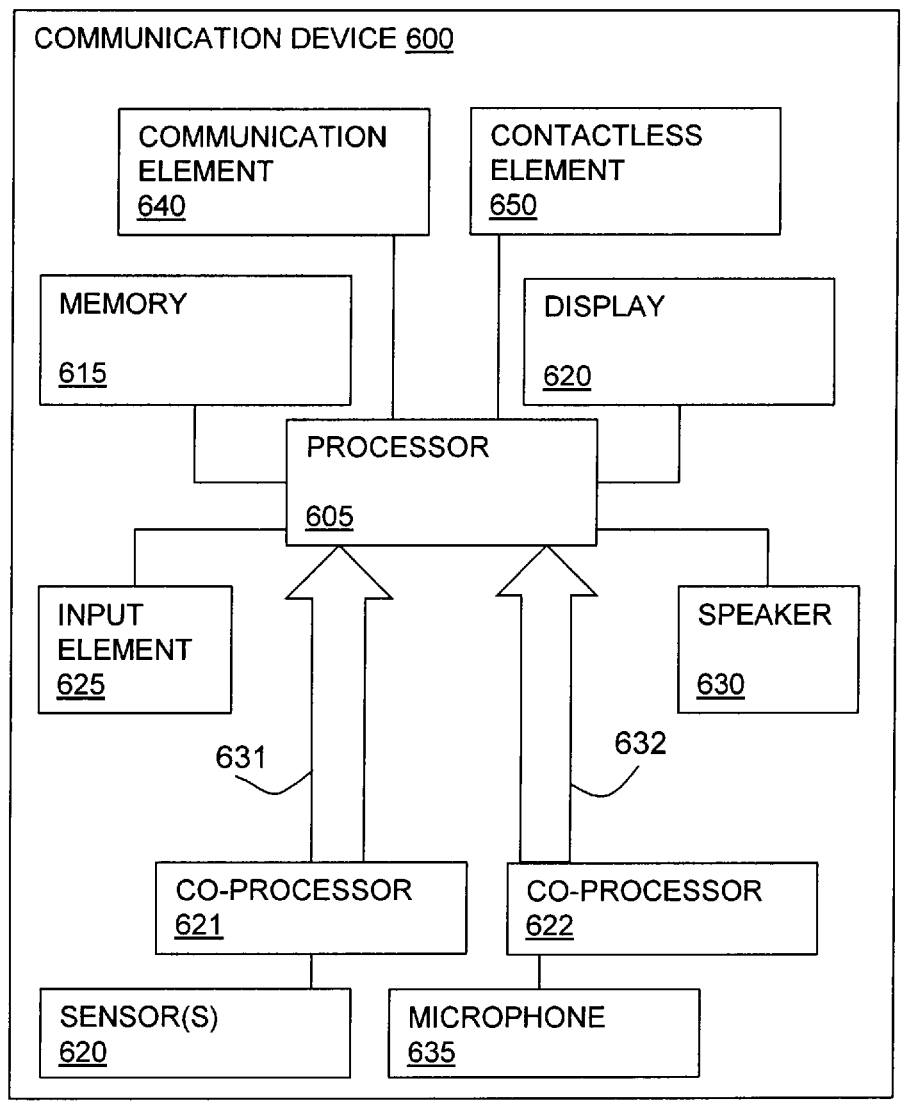
FIG. 6 is a block diagram of an embodiment of a communication device in which aspects of the present invention may be implemented.

FIG. 6 shows a block diagram of a communication device 600, such as a smart mobile phone, in which one embodiment of the described system may be implemented. The communication device 600 may be a cell phone, a feature phone, a smart phone, a satellite phone, or a computing device having a phone capability, including a wearable device such as glasses, watches, etc.

The communication device 600 may include a processor 605 (e.g., a microprocessor) for processing the functions of the communication device 600 and a display 620 to allow a user to see the phone numbers and other information and messages. The communication device 600 may further include an input element 625 to allow a user to input information into the device (e.g., input buttons, touch screen, etc.), a speaker 630 to allow the user to hear voice communication, music, etc., and a microphone 635 to allow the user to transmit his or her voice through the communication device 600.

The processor 605 of the communication device 600 may connect to a memory 615. The memory 615 may be in the form of a computer-readable medium that stores data and, optionally, computer-executable instructions.

In accordance with one embodiment of the described system, the microphone 635 and other sensors 620 such as a camera may be provided in the communication device 600 each having a dedicated co-processors 621, 622. In this embodiment, a single channel 631, 632 is shown between the co-processors 621, 622 and the processor 605 for data transmission to the processor 605.

The communication device 600 may also include a communication element 640 for connection to communication channels (e.g., a cellular telephone network, data transmission network, Wi-Fi network, satellite-phone network, Internet network, Satellite Internet Network, etc.). The communication element 640 may include an associated wireless transfer element, such as an antenna.

The communication element 640 may include a subscriber identity module (SIM) in the form of an integrated circuit that stores an international mobile subscriber identity and the related key used to identify and authenticate a subscriber using the communication device 600. One or more subscriber identity modules may be removable from the communication device 600 or embedded in the communication device 600.

The communication device 600 may further include a contactless element 650, which is typically implemented in the form of an integrated circuit (or other data storage element) with an associated wireless transfer element, such as an antenna. The contactless element 650 may be associated with (e.g., embedded within) the communication device 600 and data or control instructions transmitted via a cellular network may be applied to the contactless element 650 by means of a contactless element interface (not shown). The contactless element interface may function to permit the exchange of data and/or control instructions between mobile device circuitry (and hence the cellular network) and the contactless element 650.

The contactless element 650 may be capable of transferring and receiving data using a near field communications (NFC) capability (or near field communications medium) typically in accordance with a standardized protocol or data transfer mechanism (e.g., ISO 14443/NFC). A near field communications capability is a short-range communications capability, such as a radio-frequency identification (RFID), Bluetooth, infra-red, or other data transfer capability that can be used to exchange data between the communication device 600 and an interrogation device. Thus, the communication device 600 may be capable of communicating and transferring data and/or control instructions via both a cellular network and a near field communications capability.

As described herein, according to one aspect of the present invention, there is provided a system for monitoring use of a sensor of a computing device, comprising: a sensor for obtaining information from an environment of a computing device; a co-processor providing functionality for the sensor; at least one channel connecting the co-processor to a central processing unit (CPU) of the computing device; a monitoring component for monitoring sensor data transmission over the at least one channel to determine when a transmission of data changes from a low data transmission mode to a high data transmission mode; and a warning component for activating an alert when the transmission of data is in a high data transmission mode.

In one embodiment, the system may include: a first channel connecting the co-processor to the CPU of the computing device, wherein the first channel has a low bandwidth with a predefined bandwidth threshold; a second channel connecting the co-processor to the CPU, wherein the second channel has a higher bandwidth than the first channel; and wherein the monitoring component determines if data transmission changes from the first channel to the second channel.

In another embodiment, the system may include: a single channel connecting the co-processor to the CPU of the computing device; and wherein the monitoring component determines if data transmission on the single channel breaches a predefined threshold rate of data transmission.

The warning component may be a hardware-protected warning component to which the monitoring component is connected, and wherein the hardware-protected warning component activates an alert component.

The co-processor may be dedicated to one or more sensors and separated from the CPU at a hardware level.

The co-processor may have available working memory which is limited to a predefined size to prevent storage of sensor data. Alternatively, the co-processor has available working memory which may be wiped of stored data when a transmission of data changes from a low data transmission mode to a high data transmission mode.

The co-processor may have a memory buffer for transfer of data from a sensor to the co-processor, wherein the memory buffer is in the form of isolated memory so that the data is to go through the co-processor.

In one embodiment, the monitoring component is not re-programmable and is one of the group of: an independent integrated circuit, integrated with the CPU, integrated with the co-processor, or integrated with the at least one channel.

According to another aspect of the present invention, there is provided a method for monitoring use of a sensor of a computing device, comprising: operating a sensor for obtaining information from an environment of a computing device, wherein the sensor uses a co-processor for functionality; sending sensor data using at least one channel connecting the co-processor to a central processing unit (CPU) of the computing device; monitoring sensor data transmission over the at least one channel to determine when a transmission of data changes from a low data transmission mode to a high data transmission mode; and activating an alert when the transmission of data is in a high data transmission mode.

In one embodiment, the method may include: sending background sensor data using a first channel connecting the co-processor to the CPU of the computing device, wherein the first channel has a low bandwidth with a predefined bandwidth threshold; sending sensor data using a second channel connecting the co-processor to the CPU when the sensor data exceeds the capacity of the first channel, wherein the second channel has a higher bandwidth than the first channel; and wherein monitoring sensor data transmission determines if the data transmission changes from the first channel to the second channel thereby indicating that the transmission of data is in a high data transmission mode.

In another embodiment, the method may include: using a single channel to send sensor data from the co-processor to the CPU of the computing device; and wherein the monitoring sensor data transmission determines if data transmission on the single channel breaches a predefined threshold rate of data transmission thereby indicating that the transmission of data is in a high data transmission mode.

The co-processor may have available working memory which is limited to a predefined size to prevent storage of sensor data. Alternatively, the co-processor may have available working memory and the method may include: wiping the working memory of stored data when a transmission of data changes from a low data transmission mode to a high data transmission mode.

According to yet another aspect of the present invention, there is provided a computer program stored on a computer readable medium and loadable into the internal memory of a digital computer, comprising software code portions, when said program is run on a computer, for performing the method of an aspect of the present invention.

Aspects of the invention provide the allowing of background data to be transmitted by a sensor whilst raising an alert when a substantial amount of sensor data is transmitted.

One or more aspects of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of aspects of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of aspects of the present invention.

What is claimed is:

1. A system for monitoring use of a sensor of a computing device, the system comprising:
    a memory; and
    a processor in communication with the memory, wherein the system is configured to perform a method, the method comprising:
        obtaining, by the sensor, information from an environment of the computing device, wherein the sensor uses a co-processor for functionality;
        sending sensor data to a central processing unit (CPU) of the computing device, the sending using one or more channels connecting the co-processor to the CPU of the computing device, wherein the co-processor is dedicated to one or more sensors and separated from the CPU at a hardware level;
        sending background sensor data using a first channel connecting the co-processor to the CPU of the computing device, wherein the first channel has a low bandwidth with a predefined bandwidth threshold;
        sending sensor data using a second channel connecting the co-processor to the CPU when the sensor data exceeds the capacity of the first channel, wherein the second channel has a higher bandwidth than the first channel;
        using a third channel comprising a single channel to send sensor data from the co-processor to the CPU of the computing device;
        monitoring sensor data transmission over the one or more channels;
        based on the monitoring, determining that a transmission of data changed from a high data transmission mode to a low data transmission mode, based on detecting a condition selected from the group consisting of:
            detecting a change from a higher bandwidth channel to a lower bandwidth channel in the one or more channels, the detecting comprising determining that transmission of the data changed from the second channel to the first channel, and
            detecting that a threshold data transmission rate of the one or more channels does not meet a predefined threshold rate of data transmission on the third channel; and
        activating an alert based on detecting the condition.

2. The system of claim 1, wherein the method further comprises:
    sending background sensor data using a first channel connecting the co-processor to the CPU of the computing device, wherein the first channel has a low bandwidth with a predefined bandwidth threshold;
    sending sensor data using a second channel connecting the co-processor to the CPU when the sensor data exceeds the capacity of the first channel, wherein the second channel has a higher bandwidth than the first channel; and
    wherein determining that the transmission of the data changed is based on detecting the change from the higher bandwidth channel to the lower bandwidth channel, the detecting comprising determining that transmission of the data changed from the second channel to the first channel.

3. The system of claim 1, wherein the method further includes:
    using a first channel comprising a single channel to send sensor data from the co-processor to the CPU of the computing device; and
    wherein determining that the transmission of the data changed is based on detecting that the threshold data transmission rate of the least one channel does not meet a predefined minimum threshold rate of data transmission on the first channel.

4. The system of claim 1, wherein the monitoring is performed by a monitoring component and the activating is performed by a warning component.

5. The system of claim 4, wherein the warning component is a hardware-protected warning component communicatively coupled to the monitoring component, and wherein the hardware-protected warning component activates an alert component.

6. The system of claim 1, wherein the co-processor has available working memory which is limited to a predefined size to prevent storage of sensor data.

7. The system of claim 1, wherein the co-processor has available working memory which is wiped of stored data based on the transmission of data changing from the high data transmission mode to the low data transmission mode.

8. The system of claim 1, wherein the co-processor has a memory buffer for transfer of data from the sensor to the co-processor, wherein the memory buffer is in a form of isolated memory so that the data is to go through the co-processor.

9. The system of claim 1, wherein the monitoring is performed by a monitoring component.

10. The system of claim 9, wherein the monitoring component is not re-programmable and is selected from the group consisting of: an independent integrated circuit, integrated with the CPU, integrated with the co-processor, and integrated with the one or more channels.

11. A computer-implemented method comprising:
    obtaining, by the sensor of a computing device, information from an environment of the computing device, wherein the sensor uses a co-processor for functionality;
    sending sensor data to a central processing unit (CPU) of the computing device, the sending using one or more channels connecting the co-processor to the CPU of the computing device, wherein the co-processor is dedicated to one or more sensors and separated from the CPU at a hardware level;
    sending background sensor data using a first channel connecting the co-processor to the CPU of the computing device, wherein the first channel has a low bandwidth with a predefined bandwidth threshold;
    sending sensor data using a second channel connecting the co-processor to the CPU when the sensor data exceeds the capacity of the first channel, wherein the second channel has a higher bandwidth than the first channel;

using a third channel comprising a single channel to send sensor data from the co-processor to the CPU of the computing device;
monitoring sensor data transmission over the one or more channels;
based on the monitoring, determining that a transmission of data changed from a high data transmission mode to a low data transmission mode, based on detecting a condition selected from the group consisting of:
detecting a change from a higher bandwidth channel to a lower bandwidth channel in the one or more channels, the detecting comprising determining that transmission of the data changed from the second channel to the first channel, and
detecting that a threshold data transmission rate of the one or more channels does not meet a predefined threshold rate of data transmission on the third channel; and
activating an alert based on detecting the condition.

12. The method of claim 11, wherein the method further comprises:
sending background sensor data using a first channel connecting the co-processor to the CPU of the computing device, wherein the first channel has a low bandwidth with a predefined bandwidth threshold;
sending sensor data using a second channel connecting the co-processor to the CPU when the sensor data exceeds the capacity of the first channel, wherein the second channel has a higher bandwidth than the first channel; and
wherein determining that the transmission of the data changed is based on detecting the change from the higher bandwidth channel to the lower bandwidth channel, the detecting comprising determining that transmission of the data changed from the second channel to the first channel.

13. The method of claim 11, wherein the method further includes:
using a first channel comprising a single channel to send sensor data from the co-processor to the CPU of the computing device; and
wherein determining that the transmission of the data changed is based on detecting that the threshold data transmission rate of the least one channel does not meet a predefined minimum threshold rate of data transmission on the first channel.

14. The method of claim 11, wherein the monitoring is performed by a monitoring component and the activating is performed by a warning component.

15. The method of claim 14, wherein the warning component is a hardware-protected warning component communicatively coupled to the monitoring component, and wherein the hardware-protected warning component activates an alert component.

16. The method of claim 11, wherein the co-processor has available working memory which is limited to a predefined size to prevent storage of sensor data.

17. A computer program product for monitoring use of a sensor of a computing device, the computer program product comprising:
a computer readable storage medium readable by a processing circuit and storing instructions for execution by the processing circuit for performing a method comprising:
obtaining, by the sensor, information from an environment of the computing device, wherein the sensor uses a co-processor for functionality;
sending sensor data to a central processing unit (CPU) of the computing device, the sending using one or more channels connecting the co-processor to the CPU of the computing device, wherein the co-processor is dedicated to one or more sensors and separated from the CPU at a hardware level;
sending background sensor data using a first channel connecting the co-processor to the CPU of the computing device, wherein the first channel has a low bandwidth with a predefined bandwidth threshold;
sending sensor data using a second channel connecting the co-processor to the CPU when the sensor data exceeds the capacity of the first channel, wherein the second channel has a higher bandwidth than the first channel;
using a third channel comprising a single channel to send sensor data from the co-processor to the CPU of the computing device;
monitoring sensor data transmission over the one or more channels;
based on the monitoring, determining that a transmission of data changed from a high data transmission mode to a low data transmission mode, based on detecting a condition selected from the group consisting of:
detecting a change from a higher bandwidth channel to a lower bandwidth channel in the one or more channels, the detecting comprising determining that transmission of the data changed from the second channel to the first channel, and
detecting that a threshold data transmission rate of the one or more channels does not meet a predefined threshold rate of data transmission on the third channel; and
activating an alert based on detecting the condition.

18. The computer program product of claim 17, wherein the method further comprises:
sending background sensor data using a first channel connecting the co-processor to the CPU of the computing device, wherein the first channel has a low bandwidth with a predefined bandwidth threshold;
sending sensor data using a second channel connecting the co-processor to the CPU when the sensor data exceeds the capacity of the first channel, wherein the second channel has a higher bandwidth than the first channel; and
wherein determining that the transmission of the data changed is based on detecting the change from the higher bandwidth channel to the lower bandwidth channel, the detecting comprising determining that transmission of the data changed from the second channel to the first channel.

19. The computer program product of claim 17, wherein the method further includes:
using a first channel comprising a single channel to send sensor data from the co-processor to the CPU of the computing device; and
wherein determining that the transmission of the data changed is based on detecting that the threshold data transmission rate of the least one channel does not meet a predefined minimum threshold rate of data transmission on the first channel.

20. The computer program product of claim 17, wherein the monitoring is performed by a monitoring component and the activating is performed by a warning component.

* * * * *